Oct. 18, 1938.   G. L. HEINLEIN   2,133,451
THRESHING MACHINE CYLINDER
Filed Sept. 25, 1937   2 Sheets-Sheet 1
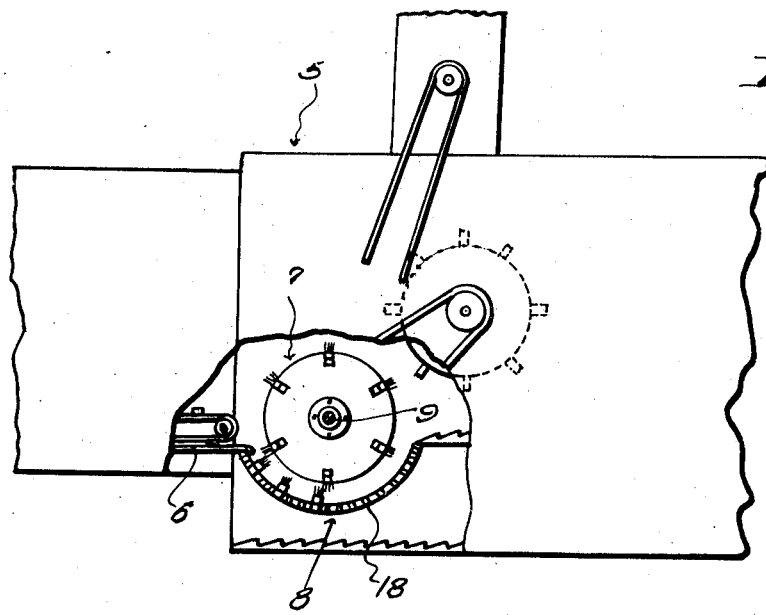
Fig. 1
Fig. 3.
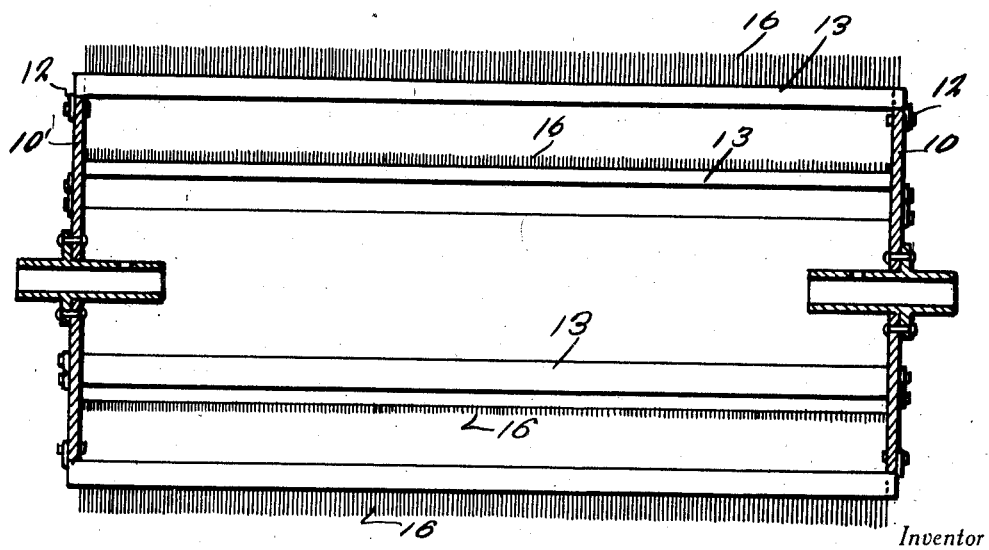
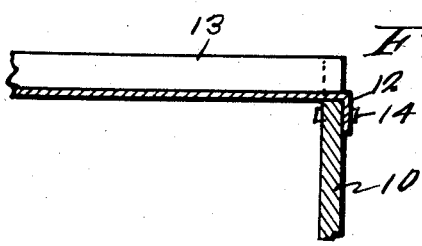
Fig. 8.
Inventor
George L. Heinlein
By Clarence A. O'Brien
Hyman Berman
Attorneys Oct. 18, 1938.  G. L. HEINLEIN  2,133,451
THRESHING MACHINE CYLINDER
Filed Sept. 25, 1937  2 Sheets-Sheet 2
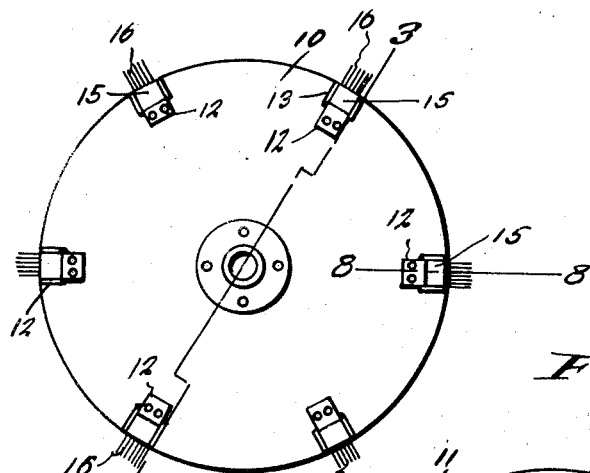
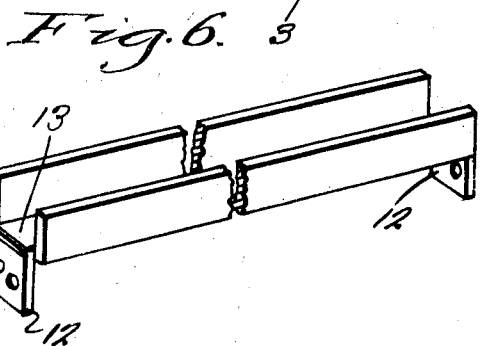
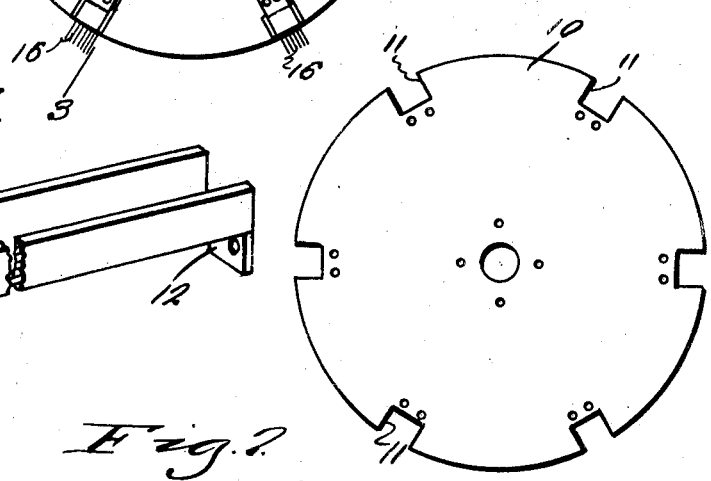
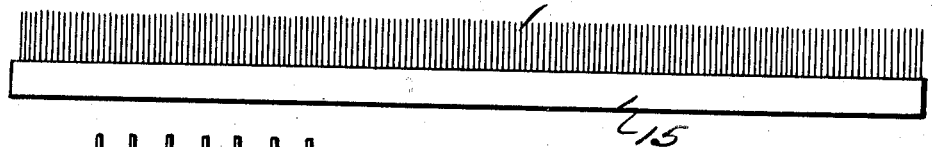
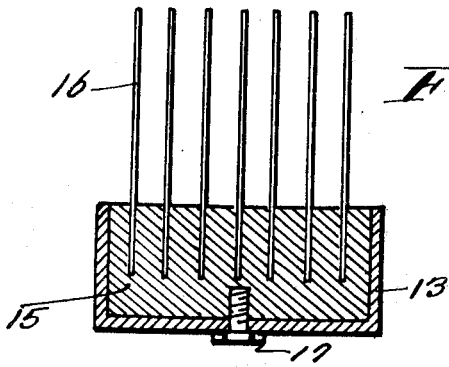
Inventor
George L. Heinlein
By Clarence A. O'Brien
Hyman Berman
Attorneys Patented Oct. 18, 1938

2,133,451

UNITED STATES PATENT OFFICE 2,133,451

THRESHING MACHINE CYLINDER

George L. Heinlein, Hamilton, Ohio

Application September 25, 1937, Serial No. 165,755

1 Claim. (Cl. 130—27)

This invention appertains to new and useful improvements in threshing cylinders for threshing machines, and also to an improved concave therefor.

The principal object of the present invention is to provide a cylinder and concave wherein the usual brush carrying elements are capable of being removed and replaced whenever they become worn or defective.

Another important object of the invention is to provide a cylinder in concave which in cooperation will be more efficient than the conventional type now in general use.

These and various other important objects and advantages of the invention will become apparent to the reader of the following specification.

In the drawings:—

Figure 1 represents a fragmentary side elevational view of a thresher with a portion broken away to disclose the cylinder.

Fig. 2 is an end elevational view of the cylinder.

Fig. 3 is a longitudinal sectional view on line 3—3 of Fig. 2.

Fig. 4 is an outside elevational view of one of the discs.

Fig. 5 is a cross sectional view of one of the brush units.

Fig. 6 is a perspective view of one of the channeled members.

Fig. 7 is a side elevational view of one of the brushes.

Fig. 8 is an enlarged detailed sectional view taken substantially on the line 8—8 of Fig. 2.

Referring to the drawings wherein like numerals designate like parts, it can be seen in Fig. 1, that numeral 5 generally refers to a thresher having the intake conveyor 6. Numeral 7 generally refers to the improved threshing cylinder, while numeral 8 generally refers to the improved concave cooperating with the cylinder.

The cylinder 7 is mounted on the shaft 9 and consists of a pair of discs 10—10, each of which is provided at its outer side and adjacent periphery with the depressions 11, for the reception of the laterally disposed and apertured lugs 12, at the ends of the channel bars 13. As shown in Fig. 8, bolts 14 are disposed through the openings in the lugs 12 and openings in the discs 10 for securing the channeled members 13 is a position bridging the peripheral portions of the discs 10.

The brush itself is shown in Fig. 7 and consists of the back 15 from which the wire bristles 16 project. The back 15 fits snugly into the channeled bar 13 and machine screws 17 are employed and disposed through the bottoms of the channeled bars 13 and into the back 15 to secure the brushes in the channeled bars.

Numeral 18 denotes the grating of the concave and to the ends of this grating 18 are secured channeled members of the type denoted by numeral 13 with the brushes shown in Fig. 7 disposed therein and secured in place as shown in Fig. 5. These brushes are made concave which are identical in construction with those on the cylinder to operate with the brushes on the cylinder in the threshing of grain.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

In a threshing machine, a threshing cylinder, said threshing cylinder comprising a pair of disk-shaped end members, said disk-shaped end members being formed with notches at their peripheries at equal circumferentially spaced intervals, elongated channeled members spanning the disk-shaped end members with the ends of the channeled members resting in the said notches, said channeled members provided with laterally disposed lugs at their ends for overlapping the disk-shaped end members, securing means between the lugs and the end members, and brushes disposed in the said channeled members.

GEORGE L. HEINLEIN.